(12) United States Patent
Gutierrez et al.

(10) Patent No.: US 10,411,889 B2
(45) Date of Patent: *Sep. 10, 2019

(54) CHAOTIC-BASED SYNCHRONIZATION FOR SECURE NETWORK COMMUNICATIONS

(71) Applicant: Intel Corporation, Santa Clara, CA (US)

(72) Inventors: David Gomez Gutierrez, Tlaquepaque (MX); Rafael De La Guardia Gonzalez, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,030

(22) Filed: Aug. 30, 2016

(65) Prior Publication Data

US 2016/0373254 A1    Dec. 22, 2016

Related U.S. Application Data

(63) Continuation of application No. 14/315,760, filed on Jun. 26, 2014, now Pat. No. 9,438,422.

(51) Int. Cl.
*G06F 21/00* (2013.01)
*H04L 29/06* (2006.01)
(Continued)

(52) U.S. Cl.
CPC ............. *H04L 9/12* (2013.01); *H04L 9/001* (2013.01); *H04W 12/02* (2013.01); *H04W 56/001* (2013.01)

(58) Field of Classification Search
CPC ........ H04L 9/12; H04L 9/001; H04W 56/001; H04W 12/02
See application file for complete search history.

(56) References Cited

U.S. PATENT DOCUMENTS

| 5,291,555 A | 3/1994 | Cuomo et al. |
| 6,999,445 B1 | 2/2006 | Dmitriev et al. |

(Continued)

FOREIGN PATENT DOCUMENTS

| CN | 103220130 | 7/2013 |
| CN | 103415009 | 11/2013 |

(Continued)

OTHER PUBLICATIONS

Bibhudendra Acharya, Nikhil Thomas, D. R. Kavin Arasu, N Vishnu Prasad; "Encryption and decryption of informative image by key image using modified Hill cipher technique based on non-invertible matrices"; Feb. 2011; Publisher: ACM; pp. 606-609 (Year: 2011).*

(Continued)

*Primary Examiner* — Kendall Dolly
*Assistant Examiner* — Courtney D Fields
(74) *Attorney, Agent, or Firm* — Trop, Pruner & Hu, P.C.

(57) ABSTRACT

In an embodiment, an apparatus includes a first logic to receive from a first node a synchronization portion of a message and to generate a set of state information using the synchronization portion, to synchronize the apparatus with the first node. The apparatus may further include a second logic to decrypt a data portion of the message using the set of state information to obtain a decrypted message. Other embodiments are described and claimed.

18 Claims, 7 Drawing Sheets

(51) Int. Cl.
*H04L 9/12* (2006.01)
*H04W 56/00* (2009.01)
*H04W 12/02* (2009.01)
*H04L 9/00* (2006.01)
*H04L 27/00* (2006.01)
*H04L 9/08* (2006.01)

(56) References Cited

U.S. PATENT DOCUMENTS

| | | | |
|---|---|---|---|
| 7,912,212 | B2 | 3/2011 | Alpcan et al. |
| 8,320,558 | B1 | 11/2012 | Nicolas |
| 8,340,295 | B2 | 12/2012 | Michaels et al. |
| 2004/0223616 | A1 | 11/2004 | Kocarev |
| 2005/0089169 | A1* | 4/2005 | Kim .................. H04L 9/06 380/263 |
| 2007/0050614 | A1* | 3/2007 | Lin .................. H04L 9/001 713/150 |
| 2011/0002460 | A1 | 1/2011 | Michaels et al. |

FOREIGN PATENT DOCUMENTS

| | | | |
|---|---|---|---|
| CN | 103825700 | 5/2014 | |
| EP | 467239 | 1/1992 | |
| EP | 1971070 A1 * | 9/2008 | ............. H04L 9/001 |
| JP | 2000049771 | 2/2000 | |
| JP | 2000083020 | 3/2000 | |
| JP | 2003069695 | 3/2003 | |
| JP | 2007213196 | 8/2007 | |
| JP | 9012-034308 | 2/2012 | |
| WO | 2013-152725 | 10/2013 | |

OTHER PUBLICATIONS

International Searching Authority, "Notification of Transmittal of the International Search Report and the Written Opinion of the International Searching Authority," dated Oct. 13, 2015 in International application No. PCT/US2015/036882.
Guanrong Chen, "Introducing the Generalized Lorenz Systems Family: Theory and Applications," Centre for Chaos and Complex Networks City University of Hong Kong, Sep. 9, 2009, 56 pages.
U.S. Appl. No. 14/249,873, filed Apr. 10, 2014, entitled, "Time-Synchronizing a Group of Nodes," by David Gomez Gutierrez.
Xiaojiang Du, et al., "Secure and Efficient Time Synchronization in Heterogeneous Sensor Networks," IEEE Transactions on Vehicular Technology, 2007, pp. 1-8.
Jaydip Sen, "Security and Privacy Issues in Wireless Mesh Networks: A Survey," Innovation Labs, Tata Consultancy Services Ltd. Kolkata, Date Unknown, pp. 1-62.
Muhammad Shoaib Siddiqui, et al., "Security Issues in Wireless Mesh Networks," 2007 International Conference on Multimedia and Ubiquitous Engineering, 2007, 6 pages.
Yin Xianglan, et al., "ASTS: An Agile Secure Time Synchronization Protocol for Wireless Sensor Networks," Department of Computer Engineering, PLA University of Science and Technology, 2007, 4 pages.
Masahiro Kuroda, et al., "Low-power Secure Body Area Network for Vital Sensors toward IEEE802.15.6," 31st Annual International Conference of the IEEE EMBS Minneapolis, Minnesota, USA, Sep. 2-6, 2009, 4 pages.
Krishna K. Venkatasubramanian, et al., "PSKA: Usable and Secure Key Agreement Scheme for Body Area Networks," IEEE Transactions on Information Technology in Biomedicine, vol. 14, No. 1, Jan. 2010, 9 pages.
Nivedita Mukherjee, "A Dynamic Cryptographic Algorithm to Provide Nodal Level Security in Wireless Sensor Network," 2010 International Conference on Innovative Computing and Communication, 6 pages.
Mizanur Rahman, et al., "Secure Time Synchronization for Wireless Sensor Networks Based on Bilinear Pairing Functions," 2010, 15 pages.
Delphine Christin, et al., "Security and Privacy Objectives for Sensing Applications in Wireless Community Networks," Date Unknown, 6 pages.
Guohong Cao, et al., "Security and Privacy in Emerging Wireless Networks," IEEE Wireless Communications, Oct. 2010, 2 pages.
Arun Kumar Tripathi, et al., "An Approach for Secure Time Synchronization in Wireless Sensor Network," 2010, 5 pages.
Roberto Solis Robles, et al., "Secure Network-Wide Clock Synchronization in Wireless Sensor Networks," 2010, 6 pages.
H. Ning, et al., "Scalable and distributed key array authentication protocol in radio frequency identification-based sensor systems," The Institution of Engineering and Technology 2011, 14 pages.
Bo Mi, et al., "A Novel Key Establishment Scheme for Wireless Sensor Networks Based on Complex Network Synchronization," Dec. 2011, 5 pages.
Ngu Nguyen, et al., "Using ambient audio in secure mobile phone communication," Mar. 19-23, 2012, 4 pages.
Yongsheng Liu, et al., "Lightweight Secure Global Time Synchronization for Wireless Sensor Networks," 2012, 6 pages.
A. Selcuk Uluagac, et al., "Secure Source-BAsed Loose Synchronization (SOBAS) for Wireless Sensor Networks," IEEE Transactions on Parallel and Distributed Systems, vol. 24, No. 4, Apr. 2013, 11 pages.
Sarang Karpate, et al., "A Novel Encryption Algorithm Using Chaotic Lorenz Attractor and Knights Tour," Sep. 2015, ICCCT '15: Proceedings of the Sixth International Conference on Computer and Communication Technology 2015; Publisher: ACM; pp. 1-5.
Oketanti, et al., "Chaotic Communication Method Using Globally Coupled Maps", Journal A of IEICE, Japan, the Institute of Electronics, Information and Communication Engineers, Aug. 25, 1996, vol. J79-Ak No. 8, p. 1427-1432.
Okumura, et al., "Study of Robotics Neural Network Computation (4th report)—GCM Chaotic Communication System as Robot Communication", Abstracts of the 16th Conference of the Robotics Society of Japan vol. 1, Japan, the Robotics Society of Japan, Sep. 18, 1998, p. 135-136.
Cuomo, et al., "Synchronization of Lorenz-Based Chaotic Circuits with Applications to Communications", IEEE Transactions on Circuits and Systems II: Analog and Digital Signal Processing, US, IEEE, Oct. 1993, vol. 40, No. 10, p. 626-633.
Japan Patent Office, Notice of Reason of Rejection dated Dec. 20, 2017 in Japanese Patent Application No. 2016-571159.
Japan Patent Office, Notice of Allowance dated Jun. 7, 2018 in Japanese Patent Application No. 2016-571159.
Japan Patent Office, Notice of Reason(s) for Rejection dated Apr. 18, 2018 in Japanese Patent Application No. 2016-571159.
State Intellectual Property Office of the People's Republic of China, First Office Action dated Dec. 5, 2018 in Chinese Patent Application No. 201580027609.0.
China National Intellectual Property Administration, dated Jul. 2, 2019, in Chinese Patent Application No. 201580027609.0.

* cited by examiner

CHAOTIC-BASED SYNCHRONIZATION FOR SECURE NETWORK COMMUNICATIONS

This application is a continuation of U.S. patent application Ser. No. 14/315,760, filed Jun. 26, 2014, the content of which is hereby incorporated by reference.

BACKGROUND

Communication between interconnected devices is a cornerstone of the modern information age. In countless situations every day, devices communicate with each other to relay information. Oftentimes, the information is of a sensitive nature and can be secured by various encryption technologies and sent via encrypted or trusted channels. While current mechanisms may in many cases provide sufficient levels of security, often the techniques used are complex and require use of specific hardware, cryptographic keys, and so forth. In addition, such mechanisms can be subject to attack, particularly where communications are sent by unencrypted or untrusted channels.

DETAILED DESCRIPTION

Figure 1:
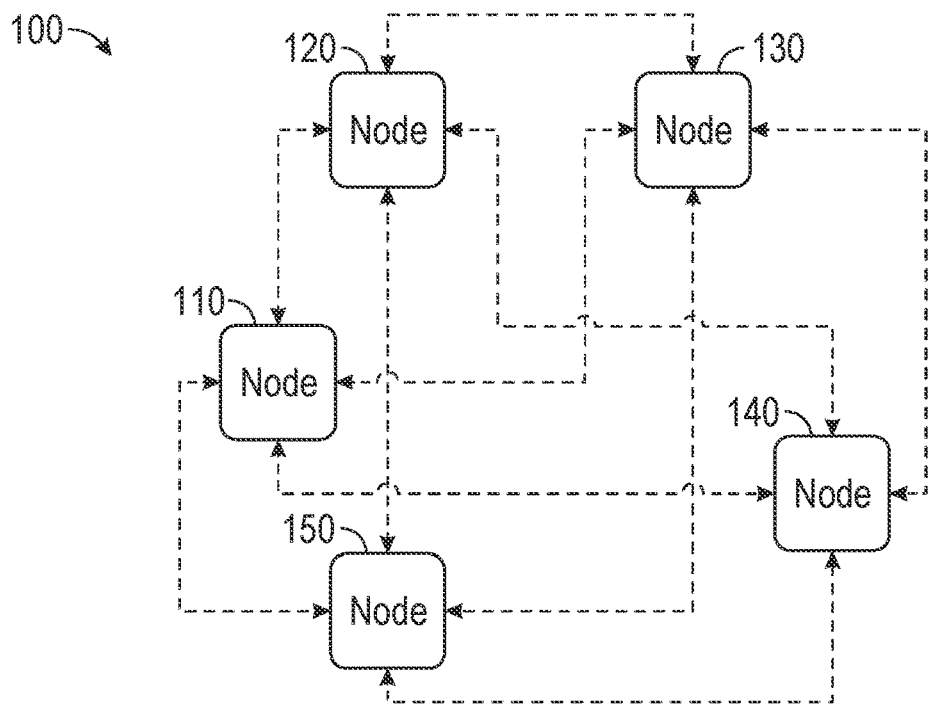
FIG. 1 is a block diagram illustrating a network in accordance with some embodiments.

In various embodiments, a dynamic network of devices can perform a fully distributed time-based synchronization. In this way, a collection of systems (which may include, but is not limited to computer systems, robots, sensors, or other devices, and any combination of such devices, herein referred to as "nodes") can achieve timing synchronization in a fully distributed manner, in contrast to a master/slave arrangement. Secure, encrypted messages may then be sent between nodes via open (unencrypted, untrusted) channels based on this synchronization. In embodiments, a chaotic system may be used as the model for synchronization.

To this end, each node implements an internal model of an oscillator that serves as a logical clock. The nodes exchange information about the state of the logical clock with their immediate neighbors, which allows them to: identify other nodes to both share and correctly implement the same logical clock model; and align their internal clock models and thereby converge to a common time reference.

Embodiments may encrypt or modulate messages using a state of the chaotic system to enable the messages to be communicated securely through open channels. In various embodiments, each node (each of which can include both a transmitter and receiver) synthesizes the same chaotic system, and in addition each receiver may implement an observer to recover the state of the system and achieve synchronization.

Embodiments thus provide techniques to perform chaotic communication and time synchronization across multiple nodes. In this way, any number of nodes can be securely synchronized in a network to enable the communication of sensitive information. Although the scope of the present invention is not limited in this regard, embodiments may be used in Internet of Things (IoT) applications in which multiple devices may dynamically and flexibly be in communication with each other. For purposes of example and not limitation, dynamic networks of nodes may include sensor networks, peer-to-peer wireless networks and pervasive computing networks, among others. One particular example is a health system in which various sensors, e.g., in a body area network (BAN) collect and transmit private and sensitive information about an individual person.

Using embodiments described herein, sensors in a BAN or other dynamic network can transmit data or payload information securely to other nodes in the system, either for local consumption, or for storage and relay to an external server. In this last case, the data to be relayed outside the BAN may be encrypted using another type of algorithm.

As used herein, the term "payload" represents sensitive information to be communicated securely between nodes in a network. Each node implements an internal model of a chaotic system. For conciseness, the full state of the chaotic system may be referred to simply as the state of the particular node implementing the model. Only a portion of the state, called the phase, is shared with other nodes for purposes of synchronization. The state information may also be used by nodes to encode their payloads. In certain embodiments a message packet may be formed of phase information and encoded payload information and transmitted to one or more neighboring nodes using any given communication protocol. In certain cases, wireless communication may occur using protocols such as ZigBee™, Bluetooth™, or WiFi™ in accordance with a given Institute of Electrical and Electronics Engineers (IEEE) 802.11 protocol such as according to the IEEE 802.11n specification (published October 2009 as IEEE Std. 2009.5307322), etc.

Nodes may locally exchange phase information with other nodes (e.g., immediate neighbors) to implement a consensus-type synchronization algorithm. Synchronization ensures that all the nodes have the same state information so they can decode payloads from other nodes, either for local consumption or for relay. Referring now to FIG. 1, shown is a block diagram illustrating a network 100 having a group of nodes that may seek to communicate sensitive messages with each other according to a chaotic system-based synchronization, in accordance with some embodiments. In various embodiments, one or more of the nodes in a group are in direct communication with all other nodes in the group. In various embodiments, one or more of the nodes are in direct communication only with a subset of the other nodes in the group. In some embodiments, nodes 110, 120, 130, 140 and 150 may be configured as sensors in a body area network, each to perform various sensing or monitors tasks, and for purposes of secure data communication, may communicate with each other by open channels. To this end, at least some of the nodes may be substantially time synchronized with the other nodes in the network. Thus although other examples are possible, some embodiments may be used to protect private, personal information in BANs and contextual information for ambient intelligence systems.

In some embodiments, each of the nodes is configured to attempt to remain in a substantial time synchronization with the other nodes by periodically transmitting and receiving time-related information to and from at least a subset of the other nodes. It should be noted that time synchronization may also be accomplished within subgroups of the nodes.

In some embodiments, each of the nodes is configured to implement, locally, a discrete logical oscillator according to a chaotic system in order to establish a time value for that node. Various types of oscillators may be used, including discretized oscillators implemented with one, two, or more state variables.

Figure 2:
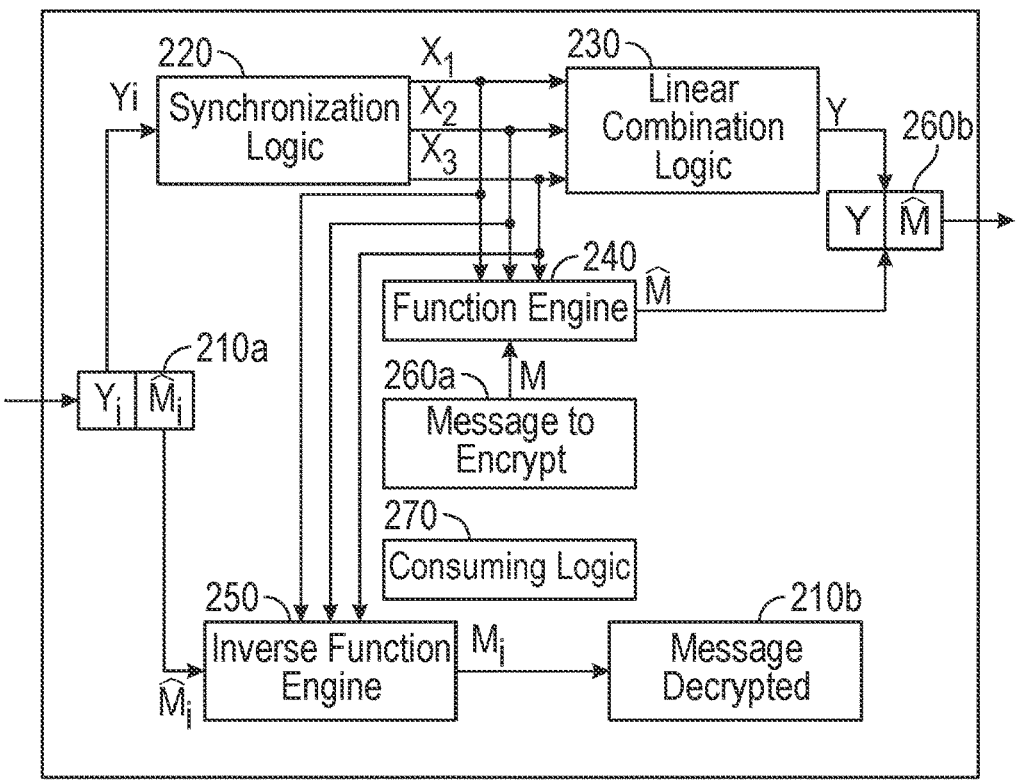
FIG. 2 is a block diagram of a node in accordance with an embodiment.

Referring now to FIG. 2, shown is a block diagram of a node in accordance with an embodiment. Understand that the portion of the node shown in FIG. 2 is with regard to chaos-based synchronization and receipt and handling of messages. However understand that additional logic and structures may be present within a given node. Furthermore, understand that while the logic shown in FIG. 2 may be applicable across a wide range of nodes, some or all of the nodes may be heterogeneous, in that other logic and circuitry of the nodes may differ.

As seen in FIG. 2, node 200, referred to herein as a local node, includes a synchronization logic 220 that may be used to perform a chaos-based synchronization. To this end, synchronization logic 220 is configured to receive a synchronization portion of an incoming message 210a, received from a neighbor node. Note that incoming message 210a may be received via an open (unencrypted) channel and may include both a synchronization portion $y_i$ and a message portion $\hat{m}$, which may be encrypted. In an embodiment, synchronization portion $y_i$ may constitute a phase of the chaotic system received from the neighbor node, thus reflecting the state of the chaotic system per the neighbor node. Using synchronization portion $y_i$, synchronization logic 220 may generate a complete state of the chaotic system, represented here by the state variables x1, x2, and x3. Understand however that in a particular implementation additional or different variables may be output, depending on the type of chaotic system used in the particular implementation.

Referring still to FIG. 2, the state of the chaotic system according to the local node is provided to a linear combination logic 230 and a function engine 240. In combination logic 230, a linear combination of the state of the chaotic system (y) may be generated. More specifically, this linear combination corresponds to a phase of the chaotic system per the local node and may be provided as a synchronization portion of an outgoing message 260b. Note that different types of linear combinations of the chaotic system state may be generated in different implementations. For example, a single variable of the state (e.g., only one of x1, x2, or x3) may constitute a linear combination in one embodiment, while in another case a linear combination of 2 or 3 of the state variables may constitute the linear combination.

As discussed, the chaotic system state is further provided to a function engine 240, which may be configured as various hardware, software, firmware, and/or combinations thereof to perform a non-linear function (generally g (x1, x2, x3)) on a message to be encrypted, namely a message 260a (including message content m), using the state variables to generate an encrypted message $\hat{m}$. Several representative examples of a non-linear functions performed using function engine 240 are provided below.

Still referring to FIG. 2, the state of the chaotic system is further provided to an inverse function engine 250. Inverse function engine 250 further receives a message portion of the incoming message 210a, $\hat{m}$. In various embodiments, this message portion may have been encrypted by the neighbor node. Using inverse function engine 250, this message portion may be decrypted based on an inverted nonlinear function (which may be the inverse of function the function used by function engine 240, generally $g^{-1}$ (x1, x2, x3)). Thus function engine 250 outputs a decrypted message 210b corresponding to the encrypted message portion of incoming message 210a.

This decrypted message 210b may be provided to a consuming logic 270. Although the scope of the present invention is not limited this regard, in an embodiment such consuming logic may be all or a portion of a processor core or other processing logic. Note that such consuming logic 270 also may generate message 260a for encryption by function engine 240. Finally, as seen in FIG. 2, a resulting output message 260b is formed of a synchronization portion y and an encrypted message portion $\hat{m}$, and can be output, e.g., via another open channel to the same or different neighboring node. Understand while shown with this particular implementation in the embodiment of FIG. 2, many variations and alternatives are possible.

In contrast to other synchronization-based systems, there is no need for communication of separate synchronization messages, external information, or key operations. That is, in conventional secure time synchronization protocols for wireless secure networks, separate synchronization messages are sent, and which utilize reference points, global positioning systems (GPSs), and static pairwise key-based cryptographic mechanisms. In some cases, secure global synchronization is achieved by examining every path possibly used by attackers and then removing any links on which misbehavior is detected. Alternately, assuming that most nodes are trustworthy, to synchronize one node a number of synchronization packets from different neighbors may be used to detect abnormal nodes, at the cost of high communication overhead. In authentication-based methods, on the other hand, receivers are assured by authentication that the synchronization packets are from a trusted source and not changed by adversaries during transmission. Since nodes may be compromised by direct attack, most authentication-based time synchronization protocols focus on secure pairwise synchronization where a shared pairwise key is used to authenticate synchronization packets. In addition to high communication overhead, each node stores all pairwise keys of other nodes.

Embodiments may provide enhanced security against common attack modes on networks including Sybil attacks, message manipulation attacks and unauthorized data attacks. Embodiments may also provide validation techniques to prevent Sybil attacks and dismiss masquerading hostile entities. Still further, mechanisms may be provided to detect fake synchronization messages, and guard against replay attacks and delay attacks. Moreover, embodiments enhance security against unauthorized data access, e.g., eavesdropping, by dynamically encoding information that is transmitted via wireless communications. As such synchronization messages can be securely broadcasted in dynamic networks without adding latency and without the need to store secret keys in advance.

Figure 3:
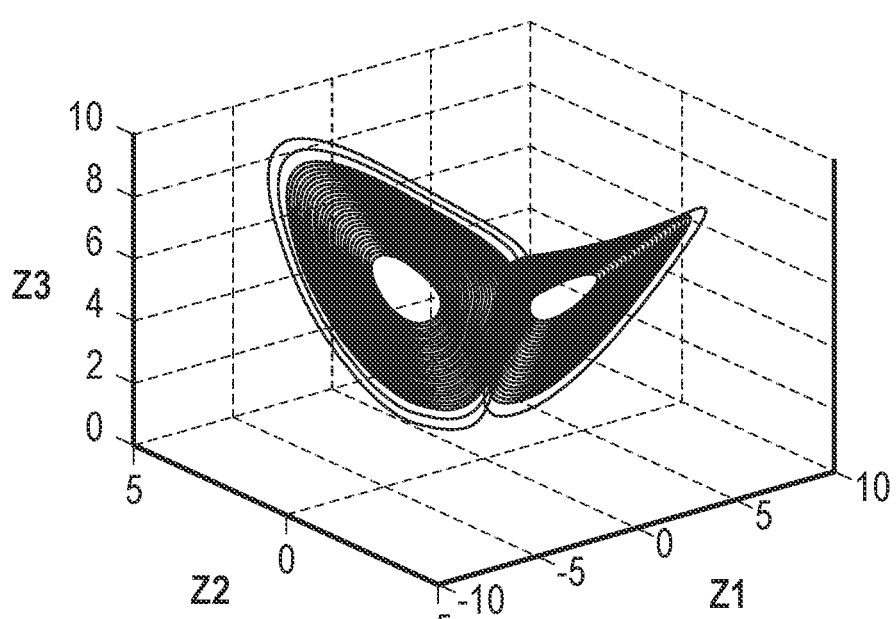
FIG. 3 is an illustration of a chaotic system in accordance with an embodiment.

In the following discussion, a generalized Lorenz system (GLS) is provided as an example of chaotic system; understand however that in other examples, a variety of other chaotic systems can be used. For simplicity, a continuous-time version of the chaotic system is presented; understand that a Euler discretization can similarly be used. The generalized Lorenz system and its chaotic behavior are shown in Table 1 and FIG. 3.

As shown in Table 1, the set of equations represent the generalized Lorenz system in its canonical form, where z1,z2 and z3 are the state variables, $\lambda 1$, $\lambda 2$, $\lambda 3$ and $\tau$ are parameters that satisfy $-\lambda 2 > \lambda 1 > -\lambda 3 > 0$ and $\tau \in (-1,\infty)$, respectively. By selecting different combinations of the parameters, different chaotic behaviors are obtained, such as the one shown in FIG. 3.

TABLE 1

Generalized Lorenz System (GLS): Generalized Lorenz Canonical Form z1 = $\lambda 1$z1 − (z1 − z2)z3
z2 = $\lambda 2$z2 − (z1 − z2)z3
z3 = $\lambda 3$z3 + (z1 − z2)(z1 + $\tau$z2)

Embodiments may thus perform dynamic or on-the-fly encryption by leveraging characteristics of chaotic systems. Namely, such systems are hard to predict, hard to identify and seemingly random. In the case of the GLS, each node transmits a synchronization portion of a message formed of a linear combination of the state. In one such embodiment this synchronization portion or phase corresponds to a linear combination of the (z1-z2) variables. Note however, that a complete state of the chaotic system (z1, z2, z3) is used for purposes of encryption/decryption. As such, only the nodes having the same chaotic system with the same parameters are able to synchronize and recover the original messages, in contrast to chaotic synchronization schemes based on a master-slave configuration.

In other cases a continuous-time GLS characteristic synchronization algorithm may be used as seen in Table 2. In Table 2, the variable e is error between the local phase and average of its neighbor's phase, $\lambda 1$, $\lambda 2$, $\lambda 3$, and $\tau$ are the system's parameters, $\eta 1$, $\eta 2$, $\eta 3$ and z1, z2, z3 are the states of the oscillator, in the observer form and in the canonical form, respectively. l1, l2 and $\rho$ are the synchronization gains to be designed, where the latter can be increased for a faster synchronization. The variable $\eta 1$=z1−z2 is the variable that is broadcasted.

TABLE 2

Synchronization Algorithm for the GLS in Continuous-Time
Synchronization Algorithm for the GLS in Continuous-time Let $\eta_{1,i}$ be the variable $\eta_1$ of the i-th neighbor of a node having n neighbors $$e = \frac{\eta_1 + \sum_{i=1}^{n} \eta_{1,i}}{n+1} - \eta_1$$

$\dot{\eta}_1 = (\lambda_1 + \lambda_2)\eta_1 + \eta_2 + \rho l_1 |e|^{1/2} \text{sign}(e)$ $\dot{\eta}_2 = -\lambda_1\lambda_2\eta_1 - (\lambda_1 - \lambda_2)\eta_1\eta_3 - \frac{(\tau+1)\eta_1^3}{2} + \rho^2 l_2 \text{sign}(e)$ $\dot{\eta}_3 = \lambda_3\eta_3 + K_1(\tau)\eta_1^2$ $K_1(\tau) = \frac{\lambda_3(\tau+1) - 2\tau\lambda_1 - 2\lambda_2}{2(\lambda_1 - \lambda_2)}$ $z_1 = \frac{\lambda_1\eta_1 + \eta_2}{\lambda_1 - \lambda_2}, z_2 = \frac{\lambda_2\eta_1 + \eta_2}{\lambda_1 - \lambda_2}, z_3 = \frac{(\tau+1)\eta_1^2}{2(\lambda_1 - \lambda_2)}$ In other cases a discrete-time GLS algorithm may be used as shown in Table 3. This algorithm is obtained by using Euler discretization on the algorithm in Table 2, that is, by using the following substitution $$\dot{\eta}_i = \frac{\eta_{i,new} - \eta_i}{\tau_s}, \quad i = 1, 2, 3,$$

where $\eta i$, new is the updated state, $\eta i$ is the previous value of the state, and $\tau s$ is the time between updates. After each update of the algorithm, $\eta i$ is set equal to $\eta i$, new.

TABLE 3

Synchronization Algorithm for the GLS Discrete-time Implementation
Synchronization Algorithm for the GLS Discrete-time Implementation Let $\eta_{1,i}$ be the variable $\eta_1$ then when a synchronization message is received from the i-th neighbor the state of the GLS is updated as follows.

e = $\eta_{1,i}$ − $\eta_1$ $\eta_{1,new} = \eta_1 + ((\lambda_1 + \lambda_2)\eta_1 + \eta_2 + \rho l_1 |e|^{1/2} \text{sign}(e))\tau_s$ $$\eta_{2,new} = \eta_2 + \left( \frac{-\lambda_1\lambda_2\eta_1 - (\lambda_1 - \lambda_2)\eta_1\eta_3 - \frac{(\tau+1)\eta_1^3}{2} + \rho^2 l_2 \text{sign}(e)}{} \right)\tau_s$$

$\eta_{3,new} = \eta_3 + (\lambda_3\eta_3 + K_1(\tau)\eta_1^2)\tau_s$ $K_1(\tau) = \frac{\lambda_3(\tau+1) - 2\tau\lambda_1 - 2\lambda_2}{2(\lambda_1 - \lambda_2)}$ More specifically, embodiments may provide a two-step algorithm for the secure transmission of information within a dynamic network. First, the nodes are synchronized using a representative synchronization algorithm, such as the more specific continuous-time GLS chaotic synchronization algorithm of Table 2 or the discrete-time GLS chaotic synchronization algorithm of Table 3. Understand of course that other chaotic systems can be used. For instance, the Unified Chaotic System may be used for secure communications, as the system is chaotic over the entire spectrum of the key system parameter. Second, messages are encrypted and decrypted using a local node's state from its own implementation of the chaotic system. More specifically, a non-linear function may be used to code messages, and a corresponding inverted non-linear function may be used to decode messages, using the chaotic state. The messages can be recovered because the chaotic state in all the nodes of the network at least substantially coincides after synchronization. In some cases, a node may implement an algorithm to detect malicious neighbors, to prevent a malicious node to desynchronize the network. Also, to increase security in a communication, system parameters may be changed, e.g., by switching among different parameters according to a certain rule known in advance. Two methods may be used, the first one is to use the network to obtain a new parameter. That is, once the secure communication is established, consensus algorithms may be used to agree in a new system's parameter along the group of nodes. The second method is to switch to a new parameter whenever a certain region in the phase space is reached, where the new parameter for each region is set a priori.

Figure 4:
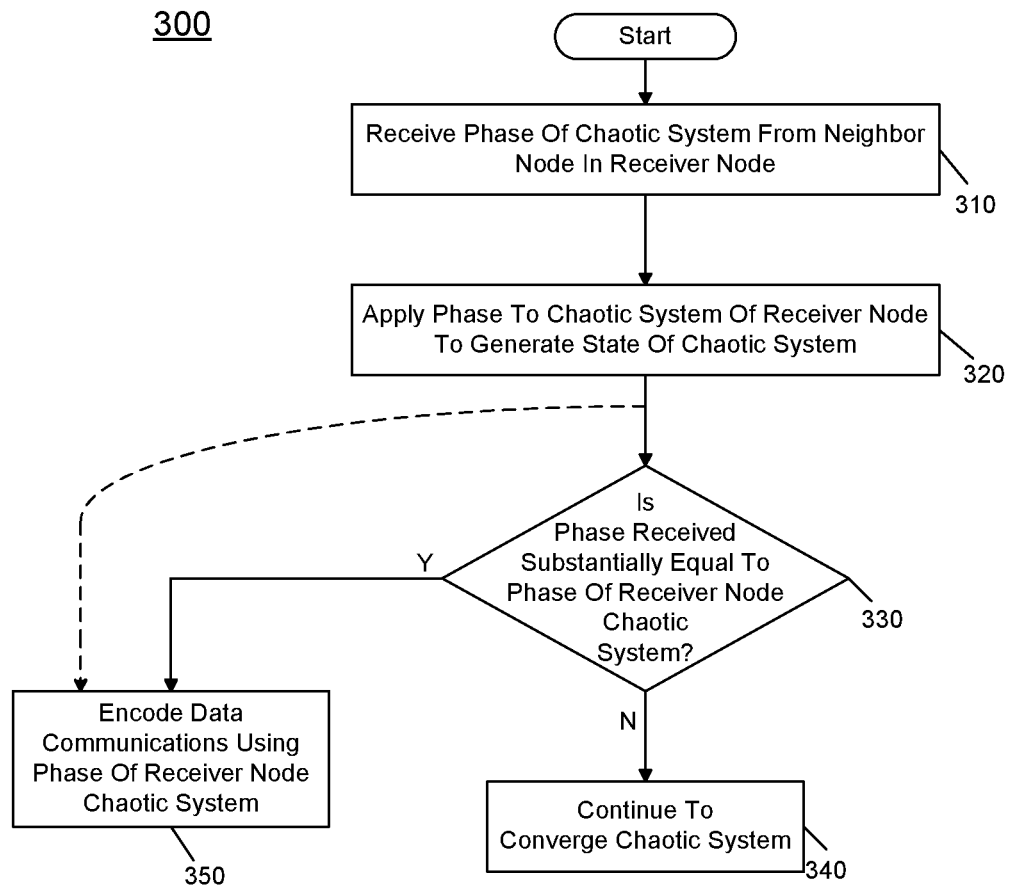
FIG. 4 is a flow diagram of a method in accordance with an embodiment of the present invention.

Referring now to FIG. 4, shown is a flow diagram of a method in accordance with an embodiment of the present invention. As shown in FIG. 4, method 300 may be a synchronization method implemented in a distributed manner by the various nodes of a network to perform a distributed (non-master/slave) chaotic-based synchronization of the network, to enable secure communications to occur using this synchronized chaotic system. As seen, method 300 may begin by receiving a phase of chaotic system from a neighbor node in a receiver node (block 310). In an embodiment, this chaotic system phase may be provided as a synchronization portion of an incoming message and may be formed as a linear combination of the chaotic system state as determined by the sender neighbor node. In turn, the receiver node uses this received phase to update its chaotic oscillator according to the synchronization algorithm (block 320). For example, an algorithm such as discussed above may be used to generate a complete state of the chaotic system (e.g., corresponding to state variables $x1$, $x2$, and $x3$).

Understand that the various nodes of the system may iteratively calculate their own internal state and provide updated synchronization information in the form of phase information to neighboring nodes and similarly, such updated phase information can be received from neighboring nodes to enable convergence. At convergence, the state of the synchronization of the chaotic system is synchronized in all the nodes such that all the nodes have the have a common or substantially common state (e.g., within a predetermined threshold).

Method 300 may be iteratively performed within each node to both converge to synchronization and to maintain a synchronized state once convergence is realized, as otherwise the chaotic system would fall out of synchronization. Note that in some embodiments, data communications may occur without regard to whether the system is synchronized. In such cases, following the dashed line in FIG. 4, control passes to block 350 where a data communication may be encoded using a phase of the receiver node and a combined message including this synchronization portion corresponding to the phase of the local node chaotic system state and a message encrypted according to the state of the local node can be sent. However understand that such data communications may not be successful if the system is not sufficiently converged.

Thus in other cases, no data communications are allowed to occur until the system converges (other than communication of phase or other synchronization information to enable such convergence to happen). Thus as further illustrated in FIG. 4, in other implementations control passes to diamond 330 to determine whether the received phase is substantially equal to a phase of the receiver node chaotic system. When these phases are at least substantially equal, this indicates synchronization and thus in such systems, control may pass back to block 350 for performing encoded data communications between the nodes. Instead if the phases are not substantially equal, control passes to block 340, where continued convergence efforts may occur. As an example, method 300 may again be iteratively performed (particularly steps 310 and 320) to enable convergence. Although shown at this high level in the embodiment of FIG. 4, understand the scope of the present invention is not limited in this regard.

Figure 5:
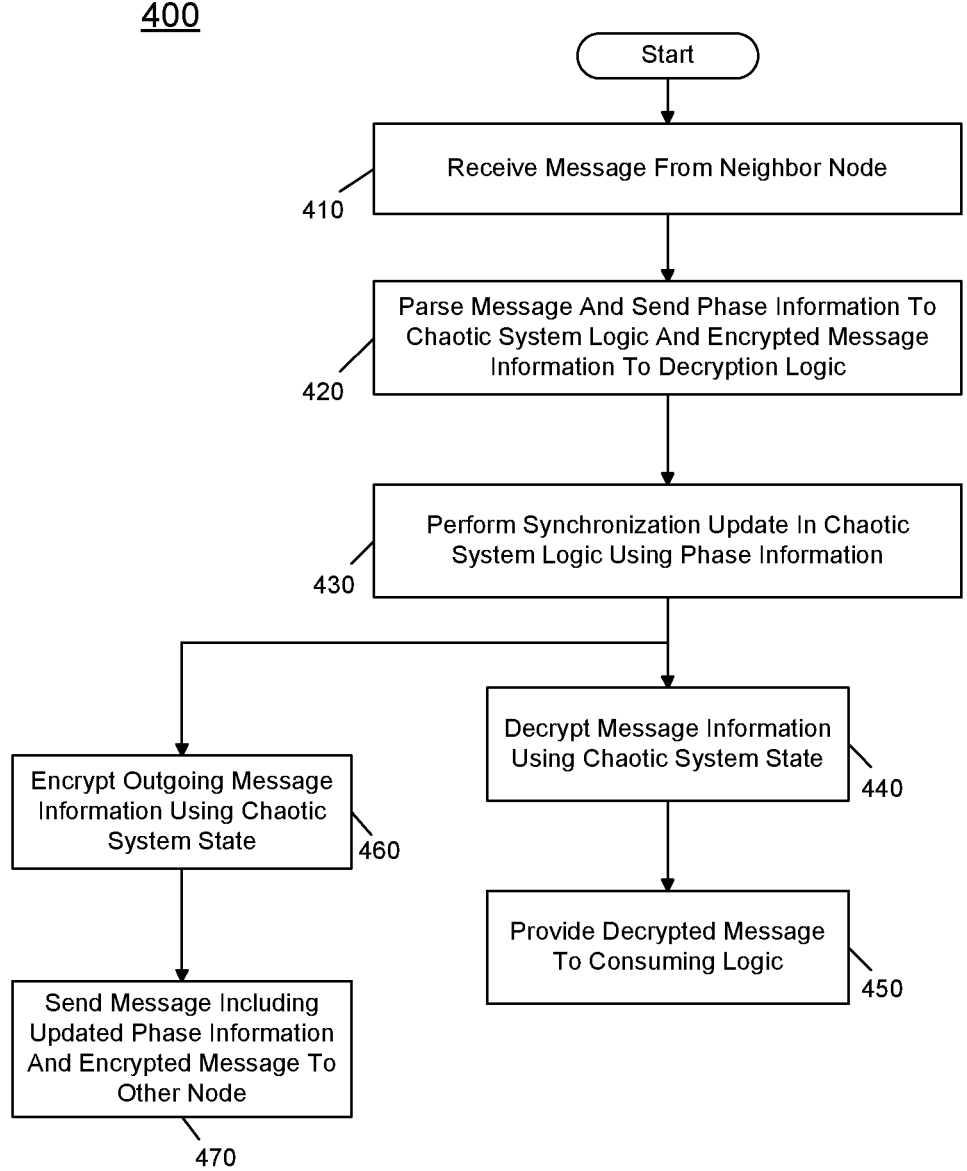
FIG. 5 is a flow diagram of a message handling method in accordance with an embodiment of the present invention.

Referring now to FIG. 5, shown is a flow diagram of a message handling method in accordance with an embodiment of the present invention. As seen, method 400 may be performed within a local or receiver node to handle an incoming message, as well as to perform certain operations for preparing a message for communication from the node. Method 400 begins by receiving a message from a neighbor node (block 410). Next control passes to block 420 where the message may be parsed. In an embodiment, the message may be parsed into 2 parts, namely a synchronization portion that includes phase information to be provided to chaotic system logic and a message portion that may include encrypted message information to be provided to decryption logic. Next at block 430, a synchronization update may be performed in the chaotic system logic using the phase information. That is, as discussed above using this received phase information, a state of the chaotic system may be generated and used for further synchronization and communication operations.

Specifically, control next passes to block 440 where the message information of the received message may be decrypted using the chaotic system state. This chaotic system state may be updated chaotic system state (as per block 430) or in some situations (depending on computation complexity) a prior state of the chaotic system may be used while such synchronization updates are performed. Thus in some embodiments blocks 430 and 440 may be performed concurrently. Next, control passes to block 450 where the decrypted message may be sent to a consuming logic, e.g., a core or other processing logic of the local node.

Understand that chaotic system state of the receiver or local node also may be used for performing encryption of messages to be sent from the node. Thus as further illustrated another branch may occur in method 400, where outgoing message information may be encrypted using the chaotic system state (block 460). This message information may be generated by consuming logic within the node, and can be provided to an encryption logic to enable the message to be encrypted using the state of the chaotic system. Control next passes to block 470 where a message can be sent from the node that includes updated phase information (which may be generated using a linear combination of the chaotic system state of the local node) and this encrypted message. This combined message may be communicated, e.g., via an open channel to another node, which may be the same node neighbor node from which the above message was received (in block 410) or can be another node of the network. Although shown with this particular illustration in FIG. 5, understand that many variations and alternatives are possible.

Figure 6:
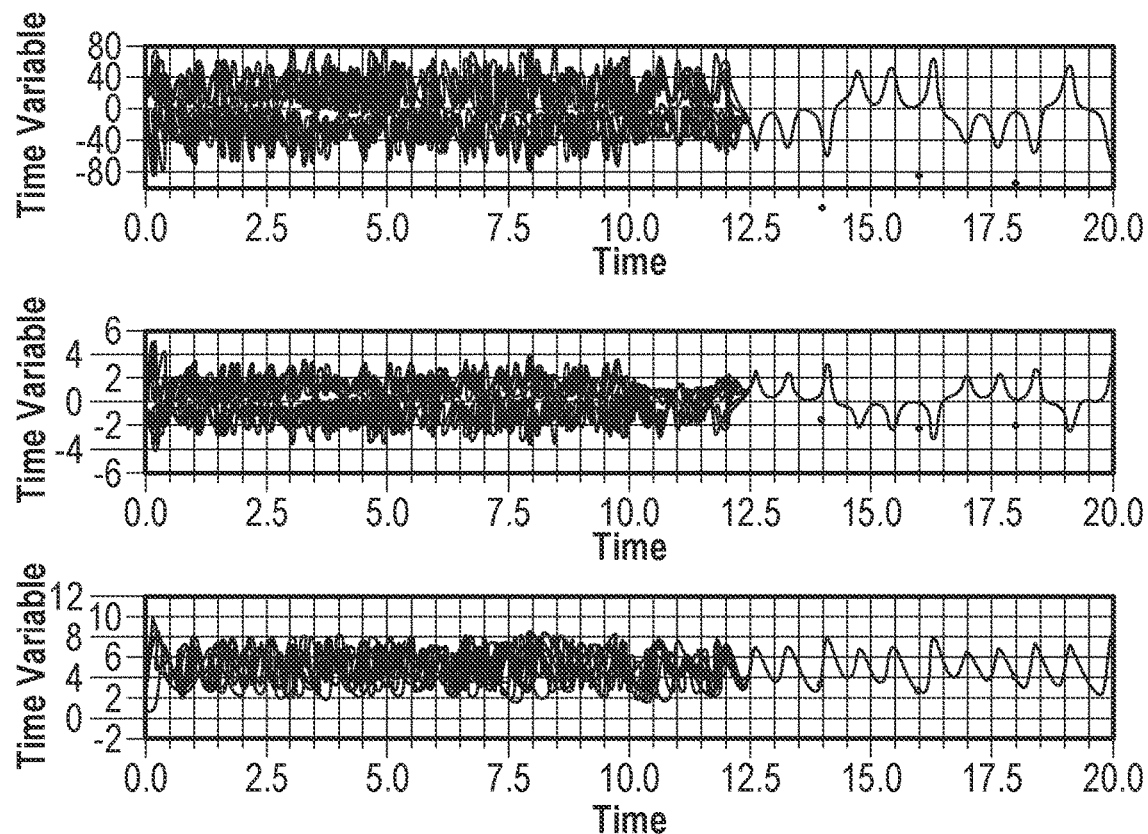
FIG. 6 shows simulation results for a synchronization of nodes in accordance with an embodiment.

FIG. 6 shows simulation results for a synchronization of 20 nodes. The nodes were initially unsynchronized and allowed to evolve freely during the first 10 units of time. Then, at time 10, the nodes were commanded to synchronize. It can be seen in FIG. 6 that the nodes quickly synchronize (in the example shown they all coincide to the same state of the chaotic system and remain synchronized after around time 13). Note that the speed of the chaotic system can be set in such a way that the delay between the transmission and reception in the communication is negligible. Hence, the state of the chaotic system is virtually the same when the message is transmitted and when it is received. Thus, each node can decrypt any and all messages received.

Figure 7:
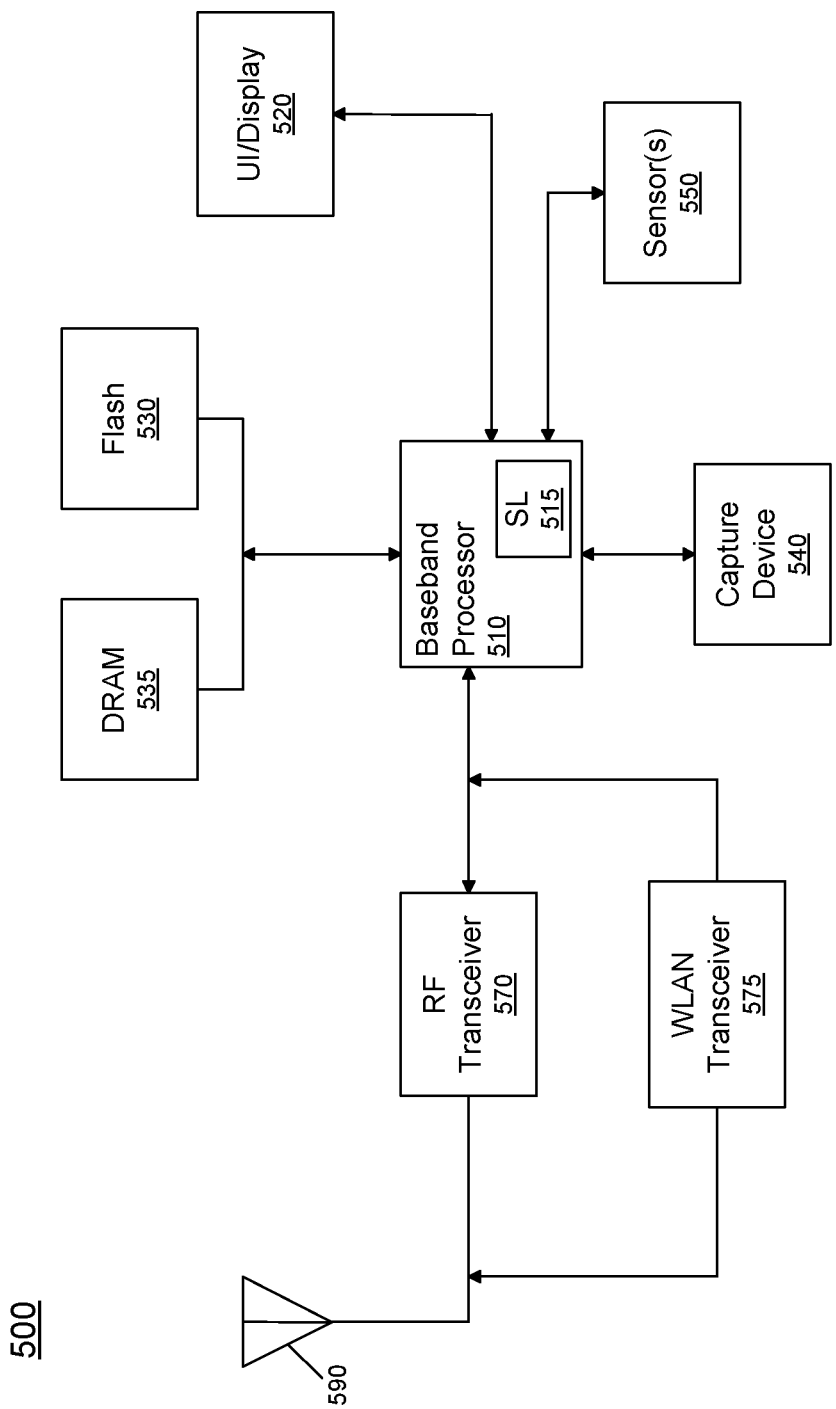
FIG. 7 is a block diagram of a system arrangement in accordance with another embodiment of the present invention.

Referring now to FIG. 7, shown is a block diagram of an example node with which embodiments can be used. As seen, node 500 may be any type of communication system, and in different embodiments may be an industrial system, body sensor, smartphone, or any other wireless communicator. As shown in the block diagram of FIG. 7, system 500 may include an application or baseband processor 510. In general, baseband processor 510 can perform various signal processing with regard to communications, as well as perform computing operations for the device. In embodiments here, baseband processor 510 can perform chaos-based synchronization with other networked nodes using a synchronization logic 515, which may generally correspond to node 200 of FIG. 2. In turn, baseband processor 510 can couple to a user interface/display 520 which can be realized, in some embodiments by a touch screen display. In addition, baseband processor 510 may couple to a memory system including, in the embodiment of FIG. 7, a non-volatile memory, namely a flash memory 530 and a system memory, namely a dynamic random access memory (DRAM) 535. As further seen, baseband processor 510 can further couple to a capture device 540 such as an image capture device that can record video and/or still images.

Also included in node 500 are one or more sensors 550 that may couple to baseband processor 510. In different implementations the sensors may be body sensors, industrial sensors, or environmental sensors, among others.

To enable communications to be transmitted and received, various circuitry may be coupled between baseband processor 510 and an antenna 590. Specifically, a radio frequency (RF) transceiver 570 and a wireless local area network (WLAN) transceiver 575 may be present. In general, RF transceiver 570 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. Other wireless communications such as receipt or transmission of radio signals, e.g., AM/FM and other signals may also be provided. In addition, via WLAN transceiver 575, local wireless signals, such as according to a Bluetooth™ standard, Zigbee™, or an IEEE 802.11 standard such as IEEE 802.11a/b/g/n can also be realized. Although shown at this high level in the embodiment of FIG. 7, understand the scope of the present invention is not limited in this regard. Further understand that nodes may be differently configured, and may not include all components shown in FIG. 7. Further understand that in an embodiment, one or more of the nodes of a network may be heterogeneous to each other.

Figure 8:
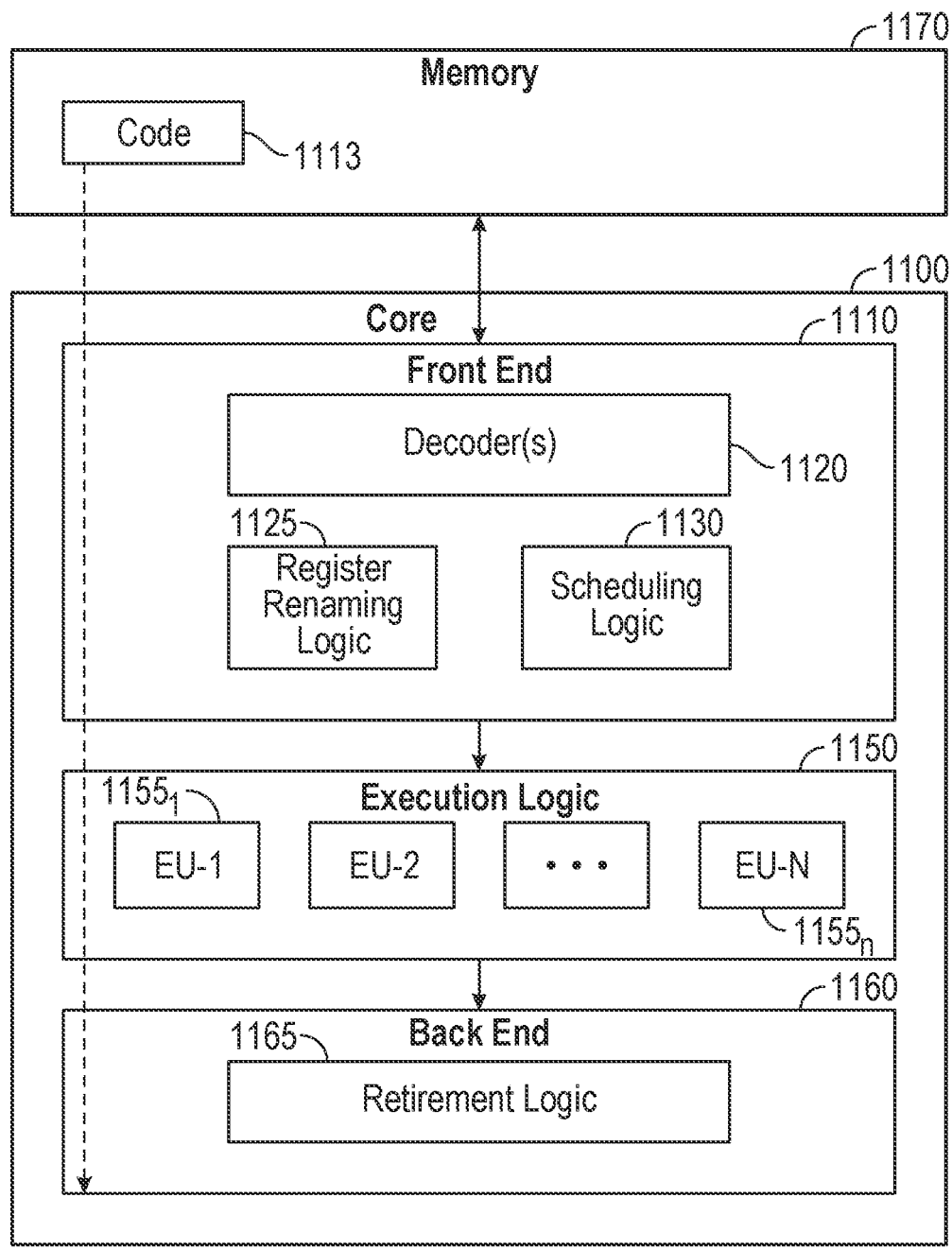
FIG. 8 is a block diagram of a processor core according to one embodiment.

FIG. 8 is a block diagram of a processor core 1100 according to one embodiment. Core 1100 may an example core of baseband processor 510 of node 500 of FIG. 7 or any other node, which may include an embedded processor, a digital signal processor (DSP), a network processor, or other device to execute code. Although only one core 1100 is illustrated in FIG. 8, a processing element may alternatively include more than one such core. Core 1100 may be a single-threaded or multi-threaded core.

FIG. 8 also illustrates a memory 1170 coupled to the processor 1100, which in an embodiment may be a DRAM. Memory 1170 may include one or more code instruction(s) 1113 to be executed by the core 1100. In core 1100, an instruction enters a front end portion 1110 and is processed by one or more decoders 1120. The decoder may generate one or more micro-operations, other instructions, or control signals, which reflect the original code instruction. In some embodiments, code 1113 may be configured to perform a chaotic-based synchronization as described herein.

Front end portion 1110 also includes a register renaming logic 1125 and a scheduling logic 1130, which generally allocate resources and schedule the operation corresponding to the converted instruction for execution. Core 1100 further includes an execution logic 1150 having a set of execution units 1155$_1$-1155$_n$. Execution logic 1150 may be configured to perform operations specified by code instructions. After completion of execution of the operations specified by the code instructions, a back end portion 1160 includes a retirement logic to retire the instructions of code 1113. In one embodiment, core 1100 allows out of order execution but reorders instructions in order for retirement. Understand that although not illustrated in FIG. 8, a processing element may include other elements on chip with core 1100. For example, a processing element may include a memory controller, I/O control logic, and one or more caches, as examples.

The following examples pertain to further embodiments.

In Example 1, an apparatus comprises: a first logic to receive from a first node a synchronization portion of a message including the synchronization portion and a data portion, and to generate a set of state information using the synchronization portion, to synchronize the apparatus with the first node; and a second logic to decrypt the data portion using the set of state information to obtain a decrypted message and to provide the decrypted message to a consuming logic of the apparatus, where the message is to be communicated from the first node via an open channel.

In Example 2, the apparatus of Example 1 optionally further includes: third logic to encrypt a second unencrypted message, generated by the consuming logic, with the set of state information to generate a second encrypted message; and a transmission logic to send a second message to a second node with a synchronization portion formed of at least a portion of the set of state information and a data portion formed of the second encrypted message.

In Example 3, the transmission logic or Example 1 or 2 is to send the second message to the second node via an open channel.

In Example 4, the third logic of Example 2 is to optionally encrypt the second unencrypted message via an invertible non-linear function having a first input corresponding to the second unencrypted message and a second input corresponding to the set of state information.

In Example 5, the synchronization portion comprises a phase of a chaotic system and the set of state information comprises a complete state of the chaotic system.

In Example 6, the phase of the chaotic system comprises a linear combination of the complete chaotic system state.

In Example 7, the apparatus of Example 1 further optionally comprises a plurality of nodes of a network having a substantially common chaotic system state.

In Example 8, the first logic of Example 7 is to perform a chaos-based synchronization of the network to generate the set of state information from the synchronization portion.

In Example 9, the chaos-based synchronization of Example 8 is to be performed according to a generalized Lorenz system.

In Example 10, the generated set of state information is at least substantially the same in the apparatus of any of the above Examples as a second set of state information used in the first node to encrypt the data portion of the message.

In Example 11, the generated set of state information and the second set of state information of Example 10 are derived without a secret key.

In Example 12, at least one computer readable medium includes instructions that when executed enable a system to: receive a message from a sender node in a receiver node; parse the message and send a synchronization portion of the message to a chaotic system logic and send an encrypted portion of the message to a decryption logic; update, in the chaotic system logic, synchronization of the receiver node using the synchronization portion, including calculation of a state of a chaotic system based at least in part on the synchronization portion; and decrypt, in the decryption logic, the encrypted portion using the state of the chaotic system.

In Example 13, the at least one computer readable medium of Example 12 optionally further comprises instructions to enable the system to decrypt the encrypted portion according to an inverted non-linear function using the chaotic system state.

In Example 14, the at least one computer readable medium of Example 12 optionally further comprises instructions to enable the system to: encrypt, in an encryption logic, data using the chaotic system state to generate a second encrypted portion; generate, in the chaotic system logic, a second synchronization portion using the chaotic system state; and transmit a second message from the receiver node, the second message including the second synchronization portion and the second encrypted portion.

In Example 15, the at least one computer readable medium of Example 14 optionally further comprises instructions to enable the system to encrypt the second encrypted portion according to a non-linear function using the chaotic system state.

In Example 16, the at least one computer readable medium of Example 14 optionally further comprises instructions to enable the system to generate the second synchronization portion according to a linear combination of at least a portion of the chaotic system state.

In Example 17, the at least one computer readable medium of Example 14 optionally further comprises instructions to enable the system to send the second message via an open wireless channel to another node of the system, where the system includes the sender node and the receiver node.

In Example 18, a system comprises: a first node including a first logic to receive from a second node a synchronization portion of a first message including the synchronization portion and a data portion, and to generate a first set of state information of a chaotic system using the synchronization portion, and a second logic to decrypt the data portion using the first set of state information, where the first message is to be communicated from the second node via an open channel; and the second node coupled to the first node, the second node including a function engine to encrypt the data portion of the first message according to a function and using a second set of state information of the chaotic system, the second set of state information at least substantially equivalent to the first set of state information, and a transmission logic to send the first message to the first node with the synchronization portion formed of at least a portion of the second set of state information.

In Example 19, the system of Example 18 optionally comprises a wireless network of nodes including the first and second nodes.

In Example 20, the Example 19 wireless network optionally comprises a body area network, the first and second nodes comprising sensors.

In Example 21, the system of Example 18 optionally comprises a sensor network having a plurality of sensors including the first and second nodes and a collection system to receive messages from the plurality of sensors, to generate a report therefrom, to encrypt the report, and to communicate the report to a central system, the central system external to the sensor network.

In Example 22, a system for synchronizing a plurality of nodes comprises: a first node including a first means for receiving from a second node a synchronization portion of a first message including the synchronization portion and a data portion, and for generating a first set of state information of a chaotic system using the synchronization portion, and a second means for decrypting the data portion using the first set of state information, where the first message is to be communicated from the second node via an open channel; and the second node coupled to the first node, the second node including a function means for encrypting the data portion of the first message according to a function and using a second set of state information of the chaotic system, the second set of state information at least substantially equivalent to the first set of state information, and a transmission means for sending the first message to the first node with the synchronization portion formed of at least a portion of the second set of state information.

In Example 23, the system of Example 22 optionally comprises a wireless network of nodes including the first and second nodes.

In Example 24, the wireless network of Example 23 optionally comprises a body area network, the first and second nodes comprising sensors.

In Example 25, the system of Example 22 optionally comprises a sensor network having a plurality of sensors including the first and second nodes and a collection system to receive messages from the plurality of sensors, to generate a report therefrom, to encrypt the report, and to communicate the report to a central system, the central system external to the sensor network.

In Example 26, an apparatus comprises: means for receiving a message from a sender node in a receiver node; means for parsing the message into a synchronization portion and an encrypted portion; means for updating synchronization of the receiver node using the synchronization portion, including means for calculating a state of a chaotic system based at least in part on the synchronization portion; and decryption means for decrypting the encrypted portion using the state of the chaotic system.

In Example 27, the apparatus of Example 26 optionally further comprises: means for encrypting data using the chaotic system state to generate a second encrypted portion; means for generating a second synchronization portion using the chaotic system state; and means for transmitting a second message from the receiver node, the second message including the second synchronization portion and the second encrypted portion.

In another Example, a computer readable medium including instructions is to perform the method of any of the above Examples. Still further, in another Example, an apparatus comprises means for performing the method of any of the above Examples.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first node of a dynamic network of nodes comprising a peer-to-peer network, the first node comprising:
   a receiver to receive a message via an open channel from a second node comprising a second device, the second node comprising a first neighbor node to the first node, the receiver to parse the message into a synchronization portion and a data portion;
   a synchronizer coupled to the receiver to receive the synchronization portion of the message, the synchronization portion comprising phase information of a chaotic system including the dynamic network of nodes, and to generate a set of state information using the synchronization portion, to synchronize the apparatus with the second node;
   a linear combiner coupled to the synchronizer to receive the set of state information, and generate a linear combination from the set of state information, the linear combination comprising the phase information of the chaotic system per the first node;
   a decrypter coupled to the receiver to decrypt the data portion comprising a payload using the set of state information to obtain a decrypted message and to provide the decrypted message comprising the payload to a consuming logic of the apparatus;
   an encrypter to encrypt a second unencrypted message comprising a second payload, generated by the consuming logic, with the set of state information to generate a second encrypted message comprising the second payload; and
   a transmitter coupled to the encrypter to send a second message to a third node comprising a third device, the third node comprising a second neighbor node to the first node, the second message including a synchronization portion formed of at least a portion of the set of state information and a data portion formed of the second encrypted message.

2. The apparatus of claim 1, wherein the transmitter is to send the second message to the third node via the open channel.

3. The apparatus of claim 1, wherein the encrypter is to encrypt the second unencrypted message via an invertible non-linear function having a first input corresponding to the second unencrypted message and a second input corresponding to the set of state information.

4. The apparatus of claim 1, wherein the phase information of the chaotic system comprises a linear combination of a complete state of the chaotic system.

5. The apparatus of claim 1, wherein the encrypter comprises a function engine to perform a non-linear function on the second unencrypted message using the set of state information.

6. The apparatus of claim 5, wherein the decrypter comprises an inverse function engine.

7. The apparatus of claim 1, wherein the synchronizer comprises a discrete logical oscillator having a plurality of state variables.

8. The apparatus of claim 1, wherein the apparatus is to change at least one system parameter, comprising to switch to at least one different system parameter, according to a predetermined rule.

9. The apparatus of claim 1, wherein the apparatus is to switch to a new system parameter when a first region in a phase space is reached.

10. A method comprising:
    receiving a message from a sending system in a receiver of a receiving system, the receiving system comprising a first node of a dynamic network of nodes comprising a point-to-point network, the sending system comprising a second node of the dynamic network;
    parsing the message and sending a synchronization portion of the message comprising a phase of a chaotic system to a chaotic system logic of the receiving system and sending an encrypted portion of the message to a decrypter of the receiving system;
    updating, in the chaotic system logic, synchronization of the receiving system using the synchronization portion, including calculating a state of the chaotic system based at least in part on the synchronization portion;
    decrypting, in the decrypter, the encrypted portion using the state of the chaotic system to recover a payload of the message and providing the payload to a core of the receiving system;
    encrypting, in an encrypter of the receiving system, data comprising a second payload using the chaotic system state to generate a second encrypted portion;
    generating, in the chaotic system logic, a second synchronization portion using the chaotic system state; and
    transmitting a second message from the receiving system to another system of the dynamic network, the second message including the second synchronization portion and the second encrypted portion.

11. The method of claim 10, further comprising decrypting the encrypted portion according to an inverted non-linear function using the chaotic system state.

12. The method of claim 10, further comprising sending the second message via an open wireless channel to the another system.

13. A system comprising:
    a first node including a processor core and a receiver to receive from a second node via an open channel a first message including a synchronization portion comprising a phase of a chaotic system and a data portion comprising a payload, a synchronization circuit to generate a first set of state information comprising a state of the chaotic system using the synchronization portion, and an inverse function engine to decrypt the data portion using the first set of state information and provide the payload to the processor core; and
    the second node coupled to the first node, the second node including a function engine to encrypt the data portion of the first message with a second set of state information comprising the state of the chaotic system according to a function, the second set of state information at least substantially coincident with the first set of state information, and a transmitter to send the first message to the first node with the synchronization portion formed of at least a portion of the second set of state information.

14. The system of claim 13, wherein the system comprises a dynamic sensor network having a plurality of sensors including the first and second nodes and a collection system to receive messages from the plurality of sensors, to generate a report therefrom, to encrypt the report, and to communicate the report to a central system, the central system external to the dynamic sensor network.

15. The system of claim 14, wherein the dynamic sensor network comprises a body area network.

16. The system of claim 13, wherein the system comprises a distributed synchronized chaotic system.

17. The apparatus of claim 1, wherein the peer-to-peer network comprises a wireless network.

18. The apparatus of claim 1, wherein the neighbor node comprises an immediate neighbor node.

* * * * *